(12) United States Patent
Shih et al.

(10) Patent No.: US 9,188,813 B2
(45) Date of Patent: Nov. 17, 2015

(54) LIQUID CRYSTAL DISPLAY PANEL AND MANUFACTURING METHOD THEREOF

(71) Applicant: Shenzhen China Star Optoelectronics Technology Co., Ltd., Shenzhen (CN)

(72) Inventors: Minghung Shih, Shenzhen (CN); Zuomin Liao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/805,674

(22) PCT Filed: Nov. 8, 2012

(86) PCT No.: PCT/CN2012/084320
§ 371 (c)(1),
(2) Date: Dec. 20, 2012

(87) PCT Pub. No.: WO2014/048012
PCT Pub. Date: Apr. 3, 2014

(65) Prior Publication Data
US 2015/0192816 A1 Jul. 9, 2015

(30) Foreign Application Priority Data

Sep. 27, 2012 (CN) .......................... 2012 1 0367114

(51) Int. Cl.
*G02F 1/1339* (2006.01)
*G02F 1/1337* (2006.01)
*G02F 1/1362* (2006.01)

(52) U.S. Cl.
CPC .......... *G02F 1/13394* (2013.01); *G02F 1/1337* (2013.01); *G02F 1/1339* (2013.01); *G02F 1/13624* (2013.01)

(58) Field of Classification Search
CPC . G02F 1/1339; G02F 1/1337; G02F 1/13394; G02F 1/13624
See application file for complete search history.

(56) References Cited

U.S. PATENT DOCUMENTS

| | | | | |
|---|---|---|---|---|
| 5,076,667 A | * | 12/1991 | Stewart et al. | 349/139 |
| 8,233,119 B2 | * | 7/2012 | Gotoh | 349/106 |
| 2002/0135715 A1 | * | 9/2002 | Miwa et al. | 349/113 |

* cited by examiner

*Primary Examiner* — James Dudek
(74) *Attorney, Agent, or Firm* — Mark M. Friedman

(57) ABSTRACT

The present invention provides a liquid crystal display panel and a manufacturing method thereof. The liquid crystal display panel includes a first plate disposing a pad on an inside surface thereof, and a second plate including a glass substrate and at least one coating layer formed on the glass substrate. Opposite the pad of the first plate, the at least one coating layer and the glass substrate of the second plate together forms a blocking groove. The present invention benefits to the narrow frame design and can assure the display effect of the liquid crystal display panel.

7 Claims, 2 Drawing Sheets

LIQUID CRYSTAL DISPLAY PANEL AND MANUFACTURING METHOD THEREOF

BACKGROUND OF THE INVENTION

1. Field of the Invention

The present invention relates to a manufacturing technology field of a liquid crystal display panel and more particularly to a liquid crystal display panel and a manufacturing method thereof.

2. Description of the Prior Art

With the continuous popular of a liquid crystal display panel, the demand for the function of every element of the liquid crystal display panel becomes more and more high.

Please refer to FIG. 1, FIG. 1 is a structure schematic view of a preferred embodiment of a liquid crystal display panel in the prior art.

The liquid crystal display panel includes a color filter (CF) plate 11 and a thin film transistor (TFT) plate 12. The CF plate 11 and the TFT plate 12 is connected together by frame glue 13.

The liquid crystal display panel has a display area A', a switch element area B' and a frame glue area C'. Opposite the display area A', an inside surface of the CF plate 11 is coated with a first alignment film 111, and an inside surface of the TFT plate 12 is coated with a second alignment film 121. Wherein the first alignment film 111 and the second alignment film 121 are formed by an inkjet way, but this way is easy to result in an uneven edge of the first alignment film 111 or the second alignment film 121. That will easily influence the frame glue area C' and is difficult to realize the design of a narrow frame.

For solving the above questions, generally the CF plate 11 disposes a pad (PS) 112 thereon to control the edge of the first alignment film 111, and the TFT plate 12 disposes a groove 122 thereon to control the edge of a second alignment film 121.

However, with the develop trend of the liquid crystal display panel with a narrow frame, it is needed to make the distance between the display area A' and the frame glue area C' be shorter. But once the distance between the display area A' and the frame glue area C' are too short, the groove 122 formed in the way of FIG. 1 will be difficult to control the edge of the second alignment film 121. Once the edge of the second alignment film 121 influences the frame glue area C', it will effect the adhesive of the frame glue 13 and further effect the display effect of the liquid crystal display panel.

in conclusion, how to realize the design of narrow frame and avoid the effect of the alignment film on the frame glue to assure the display effect of the liquid crystal display panel, is one of research directions of the liquid crystal display field.

BRIEF SUMMARY OF THE INVENTION

One object of the present invention is to provide a liquid crystal display panel to realize the design of a narrow frame and avoid the effect of the alignment film on a frame glue to assure the display effect of the liquid crystal display panel.

For realizing above beneficial effect, the present invention provides a liquid crystal display panel, comprising:
a first plate, disposing a pad on an inside surface thereof;
a second plate, including a glass substrate and at least one coating layer formed on the glass substrate;
a frame glue, connecting the first plate and the second plate;
a display area;
a frame glue area; and
a switch element area, being located between the display area and the frame glue area;
wherein, opposite the pad of the first plate, the at least one coating layer on the glass substrate forms a fault structure, and the glass substrate forms a concave structure, the fault structure and the concave structure together form a blocking groove.

In one embodiment of the present invention, the at least one coating layer of the glass substrate forms at least two switch elements on the switch element area, and the fault structure is formed between the adjacent switch elements.

In one embodiment of the present invention, the inside surface of the first plate opposite the display area is coated with a first alignment liquid to form a first alignment film, and the pad is used to block the first alignment liquid flowing toward the frame glue area.

In one embodiment of the present invention, an inside surface of the second plate opposite the display area is coated with a second alignment liquid to form a second alignment film, and the blocking groove is used to block the second alignment liquid flowing toward the frame glue area.

Another object of the present invention is to provide a liquid crystal display panel to realize the design of a narrow frame and avoid the effect of the alignment film on a frame glue to assure the display effect of the liquid crystal display panel.

For realizing above beneficial effect, the present invention provides a liquid crystal display panel, comprising:
a first plate, disposing a pad on an inside surface thereof;
a second plate, including a glass substrate and at least one coating layer formed on the glass substrate; and
a frame glue, connecting the first plate and the second plate;
wherein, opposite the pad of the first plate, the at least one coating layer and the glass substrate of the second plate together forms a blocking groove.

In one embodiment of the present invention, opposite the pad of the first plate, the at least one coating layer on the glass substrate forms a fault structure, and the glass substrate forms a concave structure, the fault structure and the concave structure together form the blocking groove.

In one embodiment of the present invention, the liquid crystal display panel further comprises a display area, a switch element area and a frame glue area, and the switch element area is located between the display area and the frame glue area;
the at least one coating layer of the glass substrate forms at least two switch elements on the switch element area, and the fault structure is formed between the adjacent switch elements.

In one embodiment of the present invention, the inside surface of the first plate opposite the display area is coated with a first alignment liquid to form a first alignment film, and the pad is used to block the first alignment liquid flowing toward the frame glue area.

In one embodiment of the present invention, an inside surface of the second plate opposite the display area is coated with a second alignment liquid to form a second alignment film, and the blocking groove is used to block the second alignment liquid flowing toward the frame glue area.

The other one object of the present invention is to provide a manufacturing method of a liquid crystal display panel, to realize the design of a narrow frame, and avoid the effect of the alignment film on a frame glue to assure the display effect of the liquid crystal display panel.

For realizing above beneficial effect, the present invention provides a manufacturing method of a liquid crystal display panel, comprising the following steps of:

providing a first plate, wherein the first plate disposes a pad on an inside surface thereof;

providing a glass substrate, forming at least one coating layer on the glass substrate, and etching the at least coating layer and the glass substrate to form a second plate, wherein opposite the pad of the first plate, the at least one coating layer and the glass substrate of the second plate together forming a blocking groove; and connecting the first plate and the second plate by a frame glue to form a liquid crystal display panel.

In one embodiment of the present invention, the step of together forming the blocking groove by the at least one coating layer and the glass substrate of the second plate specifically comprises:

after providing the glass substrate, forming a concave structure opposite the pad of the first plate on the glass substrate;

after forming the at least one coating layer on the glass substrate, and etching the at least one coating layer located at the concave structure to form a fault structure, wherein the fault structure and the concave structure together forms the blocking groove.

In one embodiment of the present invention, the liquid crystal display panel further comprises a display area, a switch element area and a frame glue area, and the switch element area is located between the display area and the frame glue area;

the step of etching the at least one coating layer specifically comprises:

etching the at least one coating layer on the glass substrate to form at least two switch elements on the switch element area, wherein the fault structure is formed between the adjacent switch elements.

In one embodiment of the present invention, after providing the first plate, the method further comprises the following step:

spreading a first alignment liquid on the inside surface of the first plate opposite the display area to form a first alignment film, wherein the pad blocks the first alignment liquid flowing toward the frame glue area.

In one embodiment of the present invention, after providing the second plate, the method further comprises the following step:

spreading a second alignment liquid on an inside surface of the second plate opposite the display area to form a second alignment film, wherein the blocking groove blocks the second alignment liquid flowing toward the frame glue area.

Comparing with the prior art, the present invention disposes the blocking groove together formed by the at least one coating layer and the glass substrate to effectively block the alignment liquid flowing toward the frame glue. Therefore, that will benefit to the design of narrow frame, avoid the effect of the alignment film on the frame glue to assure the display effect of the liquid crystal display panel.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

Figure 1:
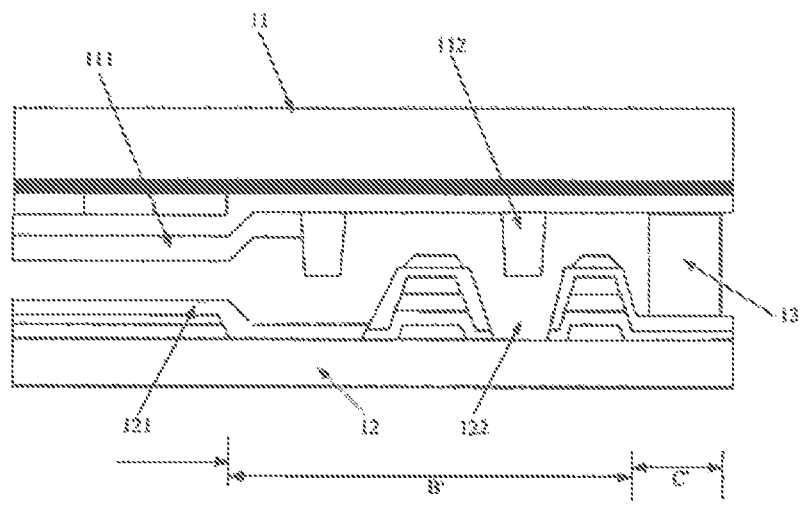
FIG. 1 is a schematic view of a sectional structure of a preferred embodiment of a liquid crystal display panel in the prior art.

The following description of every embodiment with reference to the accompanying drawings is used to exemplify a specific embodiment, which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention. In the drawings, the elements having similar structures are denoted by the same numerals.

Figure 2:
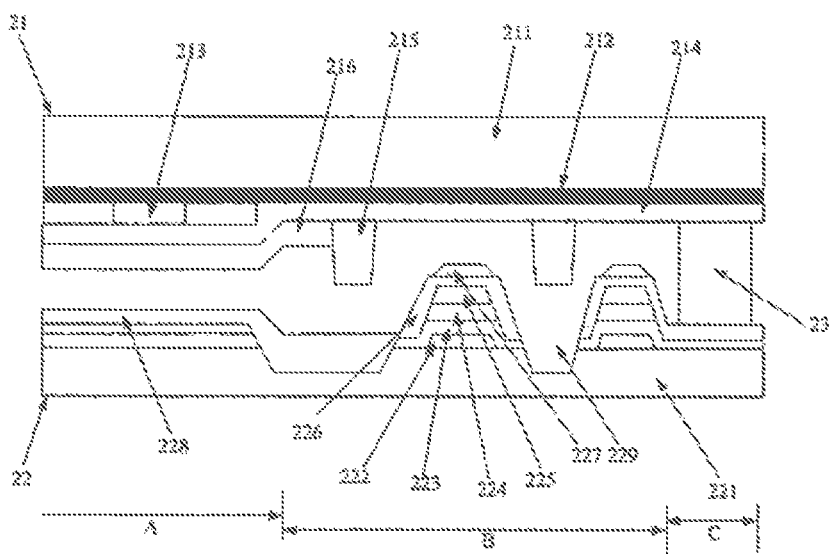
FIG. 2 is a schematic view of a sectional structure of a preferred embodiment of a liquid crystal display panel in the present invention.

Please refer to FIG. 2, FIG. 2 is a schematic view of a sectional structure of a preferred embodiment of a liquid crystal display panel provided in the present invention.

The liquid crystal display panel comprises a first plate 21, a second plate 22 and a frame glue 23. The first plate 21 and the second plate 22 are connected by the frame glue 23. For example, the first plate 21 may be a CF plate, and the second plate 22 may be a TFT plate. The liquid crystal display panel also comprises a display area A, a switch element area B and a frame glue area C. The switch element area B is located between the display area A and the frame glue area C.

The first plate 21 includes a glass substrate 211, which is coated with a black matrix (BM) layer 212. The BM layer 212 forms a color resist layer 213 (such as a red color resist, green color resist, and a blue color resist) opposite the location of the display area A. There further forms a first transparent conductive layer 214 on the color resist layer 213 and the BM layer 212. The first transparent conductive layer 214 further forms a pad (PS) 215 opposite the switch element area B, and the first transparent conductive layer 214 forms a first alignment film 216 opposite the display area A.

During the specific implement course, first it is needed to coat a first alignment liquid on the display area A of the first plate 21, and then cure the first alignment liquid to form the first alignment film 216. After spreading the first alignment liquid, the pad 215 may block the first alignment liquid flowing toward the frame glue area C of the first plate 21, and assure that the formed first alignment film 216 can not influence the frame glue area C.

Please continue referring to FIG. 2, the second plate 22 includes a glass substrate 221. The glass substrate 221 forms at least one coating layer thereon, such as a case of a TFT switch (now shown in drawings) of the switch element area B, in order, a first metal layer 222, an insulation layer 223, a semiconductor layer 224, a second metal layer 225, a protection layer 226 and a second transparent conductive layer 227. The second plate 22 further forms a second alignment film 228 opposite the location of the display area A.

During the specific implement course, the TFT switch is formed by exposing, developing and etching the at least one coating layer of the glass substrate 221.

Moreover, during the process of exposing, developing and etching the at least one coating layer of the glass substrate 221, the at least one coating layer of the second plate 22 forms a fault structure thereon opposite the pad 215 of the first plate 21. For example, there forms at least two switch elements on the switch element area B, and forms the fault structure between the two adjacent switch elements. The glass substrate 211 forms a concave structure opposite the pad 215. The fault structure and the concave structure together form a blocking groove 229. During the course of spreading a second alignment liquid to form the second alignment film 228, the blocking groove 231 may block the second alignment liquid flowing toward the frame glue area C, thereby assuring a better adhesive jointing effect of the after-formed frame glue 23.

Obviously, the present invention disposes the blocking groove 229 formed on the glass substrate 221 of the second plate 22 and located between the switch elements. During the course of spreading the second alignment liquid to form the second alignment film 228, the blocking groove 229 may block the second alignment liquid flowing toward the frame glue area C. Therefore, in the process of manufacturing the liquid crystal display panel, it can properly reduce the distance between the display area A and the frame glue area C, and still can assure that the second alignment film 228 can not influence the frame glue 23, thereby realizing the narrow frame design of the liquid crystal display panel.

Figure 3:
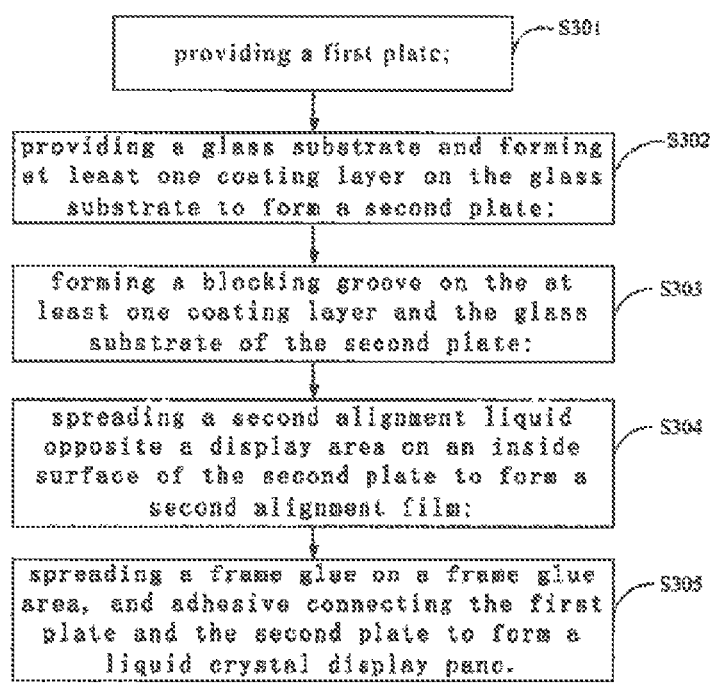
FIG. 3 is a flow chart of a manufacturing method of a liquid crystal display panel in the present invention.

Please refer to FIG. 3, FIG. 3 is a flow chart of a manufacturing method of a liquid crystal display panel in the present invention.

In the step S301, it is providing a first plate.

In the specific implement course, a waiting-formed liquid crystal display panel includes a display area, a switch element area and a frame glue area, wherein the switch element area is located between the display area and the frame glue area. The first plate forms a pad on an inside surface thereof. The pad is located on the switch element area. The first plate also forms a first alignment film on the inside surface thereof. The first alignment film is formed by spreading the first alignment liquid on the first plate. After spreading the first alignment liquid, the pad may block the first alignment liquid flowing toward the frame glue area, and further assure that the formed first alignment film can not influence the frame glue area. Because the manufacturing process of the first plate has been a mature technology, so here is no more detailed description of the first plate.

In the step S302, it is providing a glass substrate and spreading at least one coating layer on the glass substrate.

In the step S303, it is exposing, developing and etching the at least one coating layer and the glass substrate to form a second plate. The at least one coating layer and the glass substrate of the second plate together forms a blocking groove. The blocking groove is corresponding to the pad of the first plate.

In the specific implement course, the blocking groove is formed by the following way: after providing the glass substrate, first the glass substrate forms a concave structure thereon, and the concave structure is opposite the pad of the first plate. And then, the glass substrate is coated and forms the at least one coating layer. On the switch element area, the at least one coating layer is exposed, developed and etched to form at least two switch elements. There forms a fault structure between the adjacent switch elements. The fault structure and the concave structure together defines the blocking groove.

In the step S304, it is spreading a second alignment liquid on the inside surface of the second plate opposite the display area to form a second alignment film.

In the specific implement course, after spreading the second alignment liquid, the blocking groove may block the second alignment liquid flowing toward the frame glue area, and avoid the effect of the formed second alignment film on the frame glue to assure the adhesive jointing effect of the frame glue.

In the step S305, it is spreading the frame glue on the frame glue area, and adhesive jointing the first plate and the second plate by the frame glue, to form the liquid crystal display panel.

The present invention disposes the blocking groove together formed by the at least one coating layer and the glass substrate to effectively block the alignment liquid flowing toward the frame glue. Therefore, this will benefit to the design of narrow frame, avoid the effect of the alignment film on the frame glue to assure the display effect of the liquid crystal display panel.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A liquid crystal display panel, comprising:
a first plate, disposing a pad on an inside surface thereof;
a second plate, including a glass substrate and at least one coating layer formed on the glass substrate;
a frame glue, connecting the first plate and the second plate;
a display area;
a frame glue area; and
a switch element area, being located between the display area and the frame glue area;
wherein, opposite the pad of the first plate, the at least one coating layer on the glass substrate forms a fault structure, and the glass substrate forms a concave structure, the fault structure and the concave structure together form a blocking groove; and the at least one coating layer of the glass substrate forms at least two switch elements on the switch element area, and the fault structure is formed between the adjacent switch elements.

2. The liquid crystal display panel as claimed in claim 1, wherein the inside surface of the first plate opposite the display area is coated with a first alignment liquid to form a first alignment film, and the pad is used to block the first alignment liquid flowing toward the frame glue area.

3. The liquid crystal display panel as claimed in claim 1, wherein an inside surface of the second plate opposite the display area is coated with a second alignment liquid to form a second alignment film, and the blocking groove is used to block the second alignment liquid flowing toward the frame glue area.

4. A liquid crystal display panel, comprising:
a first plate, disposing a pad on an inside surface thereof;
a second plate, including a glass substrate and at least one coating layer formed on the glass substrate; and
a frame glue, connecting the first plate and the second plate;
a display area;
a frame glue area; and
a switch element area, being located between the display area and the frame glue area;
wherein, opposite the pad of the first plate, the at least one coating layer and the glass substrate of the second plate together forms a blocking groove; and the at least one coating layer of the glass substrate forms at least two switch elements on the switch element area, and the fault structure is formed between the adjacent switch elements.

5. The liquid crystal display panel as claimed in claim 4, wherein opposite the pad of the first plate, the at least one coating layer on the glass substrate forms a fault structure, and the glass substrate forms a concave structure, the fault structure and the concave structure together form the blocking groove.

6. The liquid crystal display panel as claimed in claim 4, wherein the inside surface of the first plate opposite the display area is coated with a first alignment liquid to form a first alignment film, and the pad is used to block the first alignment liquid flowing toward the frame glue area.

7. The liquid crystal display panel as claimed in claim 4, wherein an inside surface of the second plate opposite the display area is coated with a second alignment liquid to form a second alignment film, and the blocking groove is used to block the second alignment liquid flowing toward the frame glue area.

\* \* \* \* \*